US005903339A

United States Patent [19]

Levasseur

[11] Patent Number: 5,903,339

[45] **Date of Patent: *May 11, 1999**

[54] LIGHT TRANSMISSIVE DEVICE FOR OPTICAL TESTING OF TRANSPORTED BILLS

[75] Inventor: Joseph L. Levasseur, Town and Country, Mo.

[73] Assignee: Coin Acceptors, Inc., St. Louis, Mo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/728,637

[22] Filed: Oct. 10, 1996

[51] Int. Cl.[6] ........ G06K 9/74

[52] U.S. Cl. ........ 356/71; 250/555

[58] Field of Search ........ 356/71; 250/555–557, 250/559.39–4, 559.44

[56] References Cited

U.S. PATENT DOCUMENTS

| | | | |
|---|---|---|---|
| 4,451,530 | 5/1984 | Kaule et al. | 356/71 |
| 4,452,843 | 6/1984 | Kaule et al. | 356/71 |
| 4,723,072 | 2/1988 | Naruse | 250/556 |
| 5,034,616 | 7/1991 | Berrovitz | 356/71 |

*Primary Examiner*—Robert Kim

*Attorney, Agent, or Firm*—Cohn, Powell & Hind

[57] ABSTRACT

This optical scanner for testing the validity of a bill transported through a bill validator includes lower and upper members spaced to allow a bill to pass therebetween, at least one member including a light transmissive area. A light emitting element is arranged to direct light through the light transmissive area and a light receiving sensor is arranged to receive light from the light emitting element during passage of bill (B) therebetween. The light transmissive area includes a recessed portion to provide non-contact face portions of the light transmissive area spaced from the bill to preclude the transfer and build-up of dirt and abrasion of these areas.

15 Claims, 9 Drawing Sheets

LIGHT TRANSMISSIVE DEVICE FOR OPTICAL TESTING OF TRANSPORTED BILLS

BACKGROUND OF THE INVENTION

This invention relates generally to the validity testing of documents and particularly to the optical scanning of paper currency transported through vending machine bill validators.

In order to prevent the acceptance of invalid bills there are devices which perform validity tests on the bills after they are received into a bill validator acceptor opening, and while they are carried to a bill stacking position by a bill transport system, such as that shown in commonly owned U.S. Pat. No. 5,310,173.

A commonly used test is performed by an optical scanner which compares the effect of light passed through the received bill with the known effect of light passed through a valid bill. If the test is satisfactory the bill is stacked and if not, in general, it is returned to the depositor.

An early system for checking validity of bills is disclosed in U.S. Pat. No. 2,941,187 in which light is passed through specific areas of a paper currency bill to be received by a light responsive sensor. Circuitry connected to the light responsive sensor receives signals responsive to the light intensity and produces a signal responsive to the difference of the light intensity. A control system is provided to receive the signal and become active when the signal is of a predetermined intensity so that the value and denomination are accurately determined.

Other systems, generally more complicated, are known. For example, U.S. Pat. No. 3,782,543 discloses a document recognition system which provides an optical analyzer for watermark, surface print, wire band and paper density which includes a light source and two photosensitive elements which scan both sides of a bill as it passes over a guide plate aperture.

U.S. Pat. No. 3,916,914 discloses the use of a primary light source in one location and a secondary light source in another location and utilizes a lower support plate and an upper pressure plate having openings fitted with abrasive resistant light transmissive discs. The bill to be tested passes between the plates. At the primary light source the light is directed through the disc, the note, a grid and an opening in the bill support plate to be received by a sensor connected to an analyzer having output signals indicating the light intensity. At the secondary infrared light source the light is directed through the disc and reflected back to be received by an infrared detecting sensor having output signals. The note must be accepted by primary and secondary members receiving the signals for acceptance of the note.

In other, less complicated, known devices the bills are transported between upper and lower transparent plastic or glass sheets having light sources below the lower sheet and light sensors above the upper sheet. This is a simple, effective and economic means of testing the bills but, unfortunately, the surfaces of the light transmissive plastic or glass sheets through which the bills are transported become worn and collect dust or dirt. Most of the dirt is carried by the bills and tends to abrade and build up on the transparent sheet surfaces which degrades the light transmissive performance by scattering and reducing the light reaching the sensors and adversely affects the reading of the light sensors.

The present invention solves these and other problems in a manner not revealed in the known prior art.

SUMMARY OF THE INVENTION

This invention provides an optical scanning device in a bill validator which solves the problem of dirt build-up on the optical parts while maintaining the integrity of the optical path between the light transmitting and sensor elements at the location where the bills are being validated.

The problem of dirt build up and scanning of clear plastic sheets is overcome by providing recessed areas in the area of the light path, large enough to pass light but small enough so that the bills ride over the recessed areas and avoid wear of the recessed portions.

This bill scanner for determining the authenticity of a bill, comprises a first member having spaced inner and outer faces; a second member having spaced inner and outer faces, the first and second members being spaced apart to allow a bill to be transported between the inner faces of the first and second members and at least one of said members including a light transmissive area; a light emitting means arranged to direct light through the light transmissive area; and a sensor means arranged to receive light from the light emitting means; the inner face of at least one of said first and second members including a recess means substantially defining the light transmissive area to provide a non-contact face portion spaced from the bill transported across said inner face.

It is also an aspect of this invention to provide that both of said first and second members include a light transmissive means, and the light emitting means is disposed outside of one of said first and second members and the sensor means is disposed outside of the other of said first and second members.

It is an aspect of this invention to provide that the inner face of each of said first and second members includes a recess means substantially defining the associated light transmissive area to provide a non-contact face portion spaced from the bill transported between said inner faces of said first and second members.

It is another aspect of this invention to provide that the first and second members are generally parallel and the recessed area is generally arcuate in configuration.

It is yet another aspect of this invention to provide that the first and second members are formed from transparent material.

It is still another aspect of this invention to provide that the recess means of the inner face of one of said members are provided by at least two circular recesses; and the light emitting means includes two light emitting elements and the sensor means includes two associated sensor elements coaxially disposed with said light emitting elements and with associated circular recesses.

It is an aspect of this invention to provide that the recesses are substantially about 0.005 to 0.010 inches in depth.

It is another aspect of this invention to provide that the optical scanner is used in conjunction with a bill validator comprising a housing including an entrance and a bill transport system within the housing including conveying means for transporting the bill to a bill stacking position and to provide that the optical scanner is disposed between the entrance and the bill stacking position.

It is yet another aspect of this invention to provide that the first member is a lower member and the second member is an upper member, each of said lower and upper members including a pair of light transmissive areas.

It is still another aspect of this invention to provide a pair of light emitting elements disposed outside of one of said lower and upper members, and arranged to direct light through associated light transmissive areas; and a pair of sensor elements disposed outside of the other of said lower and upper members, and arranged to receive light from associated light emitting elements; the inner face of at least one of said lower and upper members including a pair of recesses substantially defining the light transmissive areas to provide non-contact face portions spaced from the bill transported across said inner face.

It is an aspect of this invention to provide that the bill transport system includes lower and upper support members, and the lower scanner member is operatively carried by the lower support member and the upper scanner member is operatively carried by the upper support member.

Still another aspect of this invention is to provide that the lower and upper scanner members are snap-fitted into the lower and upper support members, respectively.

Yet another aspect of this invention is to provide that the lower scanner member and the upper scanner member each include a generally horizontal portion providing the recesses.

It is an aspect of this invention to provide a retrofit adaptation in which the recess means is formed by an opening through said member into which is fitted a compatibly shaped transparent element having an upper surface portion disposed in spaced recessed relation from a surrounding surface of the opening. It is another aspect to provide that the opening includes an annular abutment and the element includes a shoulder engageable with said abutment, the element being received within the opening in push-fit relation, and still another aspect to provide that the opening includes an adjacent stop means and the element includes a resilient means engageable with the stop means in snap-fit relation.

This scanner system is relatively inexpensive to manufacture and install and is highly effective for its intended purpose.

DESCRIPTION OF THE PREFERRED EMBODIMENT

Figure 1:
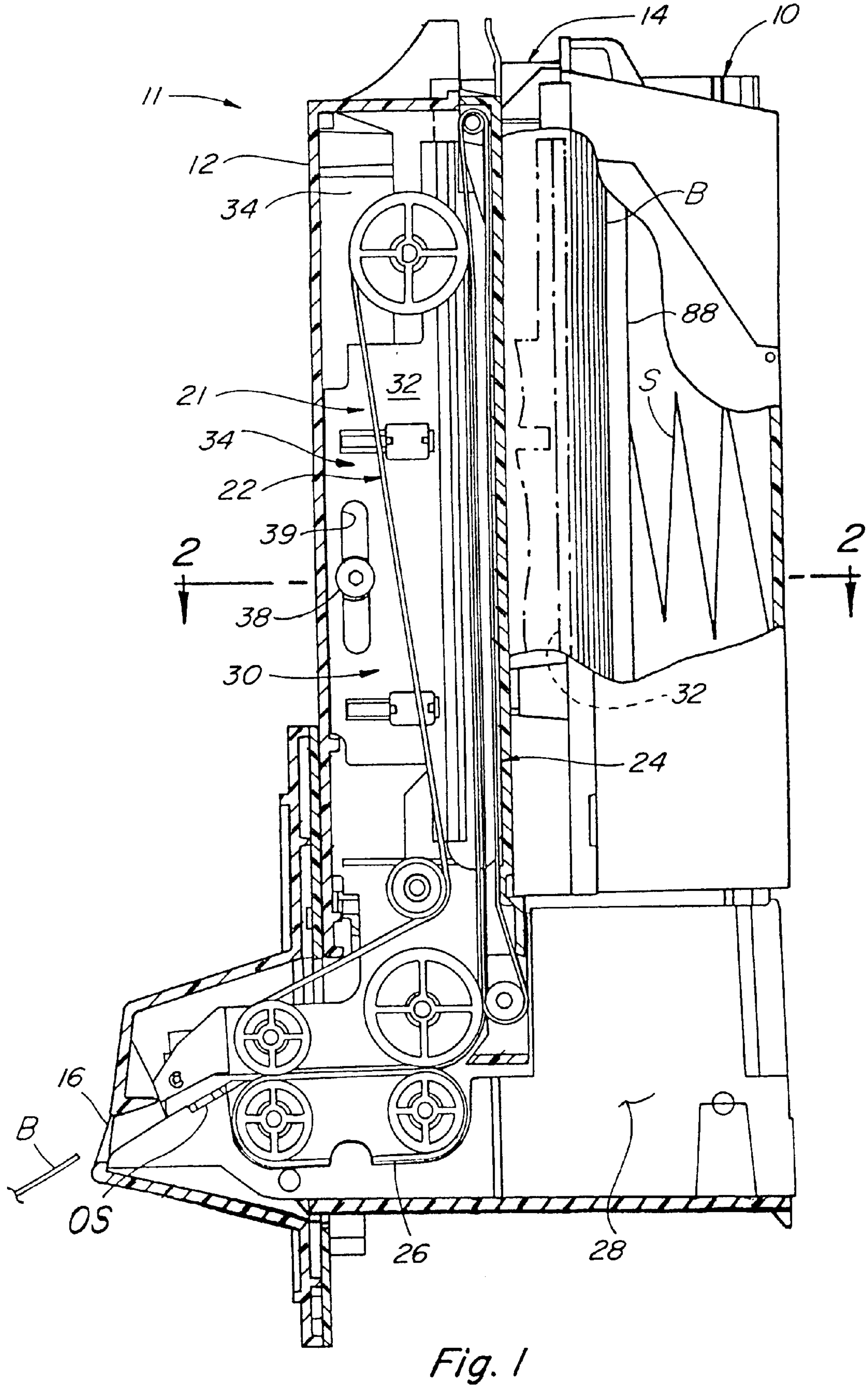
FIG. 1 is a simplified illustration of a bill validator.
Figure 2:
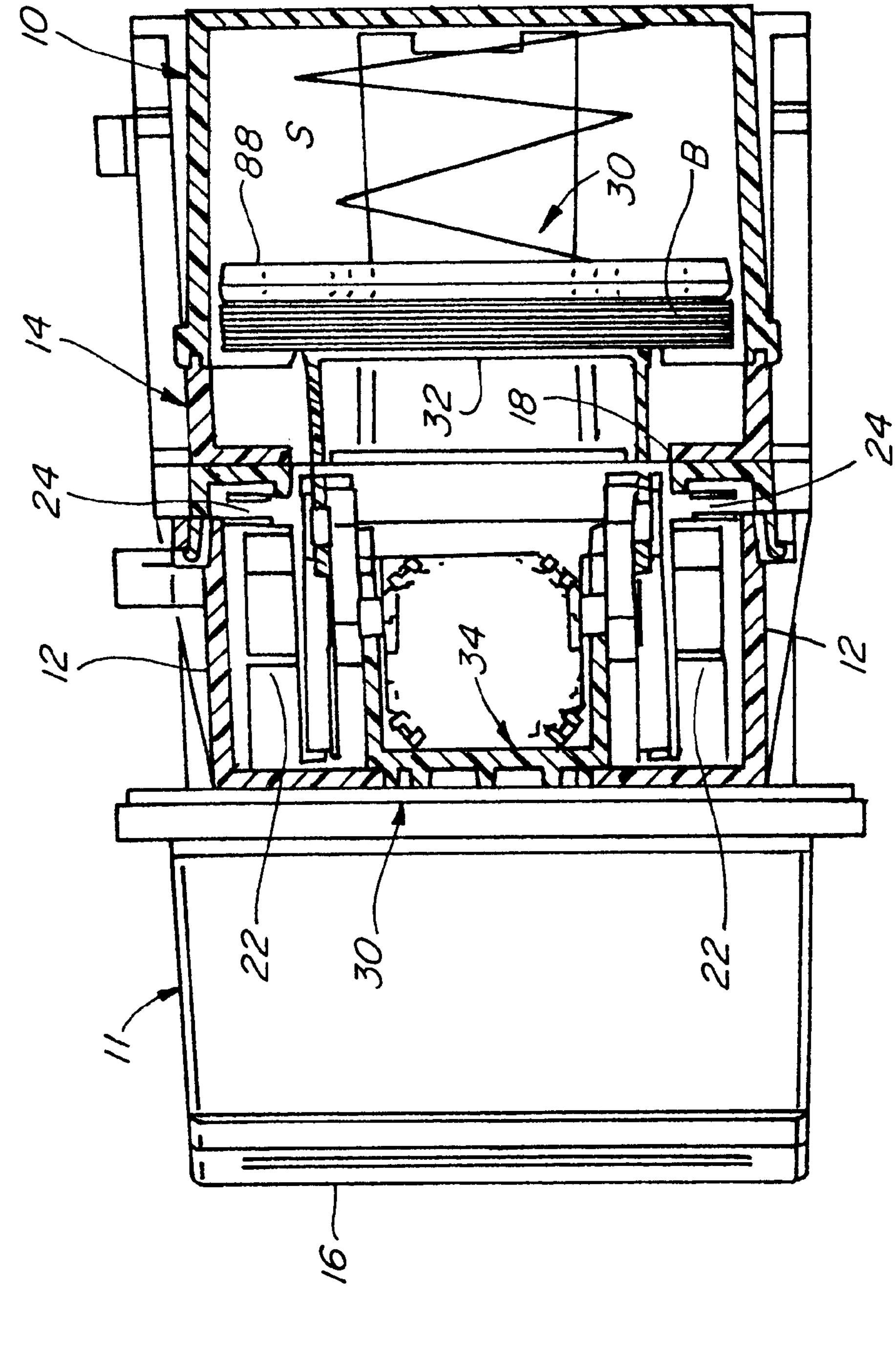
FIG. 2 is a cross sectional view taken on line 2—2 of FIG. 1.

Referring now to the drawings and first to FIGS. 1 and 2, it will be understood that there is shown, in somewhat simplified form, a bill validator 11 having a cash box 10 attached at the rear end by means of an adaptor frame 14 and having a bill receiving inlet opening 16 at the front end. The bill validator 11 in the embodiment shown includes a housing 12 for a bill transport system 21 comprising essentially three sets of spaced pairs of belt assemblies, namely twin drive belt assemblies 22 and associated twin vertical and horizontal idler assemblies 24 and 26 respectively The bill validator is similar to that shown in U.S. Pat. No. 5,310,173 and U.S. Pat. application Ser. No. 08/698,504 which are incorporated herein by reference.

In the embodiment shown herein, the drive belt assemblies 22 are mounted to an interior support 34 and disposed at each side of the access opening 18. The vertical idler assemblies 24 are mounted between housing sidewalls The second idler assemblies 26 are mounted to a support 28 below the drive belt assemblies 22.

Within the bill validator 11, as shown in FIG. 2, is a stacker mechanism 30 which includes a U-shaped pusher 32 mounted to the support 34. The support 34 also provides a mounting for a transport motor and a gearbox (not shown) which drive the transport system 21 and for a stacker motor and a gearbox (not shown) which cycles the stacker mechanism, the gearbox having a shaft 36 on which are mounted crank arms 38. The pusher 32 includes a vertical slot 39 receiving the outer end of the crank arm 38 so that the pusher is cycled on rotation of the crank arm 38 thereby providing the necessary stoke for the pusher 32 to stack a bill B against the spring-loaded cash box plate 88. The details of the transport system 21 and the stacker mechanism 30 are unnecessary for the understanding of the invention herein and can be found in the aforementioned U.S. Pat. No. 5,310,173 and Pat. application Ser. No. 08/698,504.

When a bill B is fed into the inlet opening 16 it is tested for validity by a bill optical scanner OS. If validated, the transport motor M1 is activated and the bill is carried by the transport system 21 into a vertical position aligned with a compressor plate 88 within the cash box adaptor 14. Upon cycling of the pusher plate 32 the bill B is pushed horizontally into the cash box 10 against the action of the cash box spring S.

Figure 3:
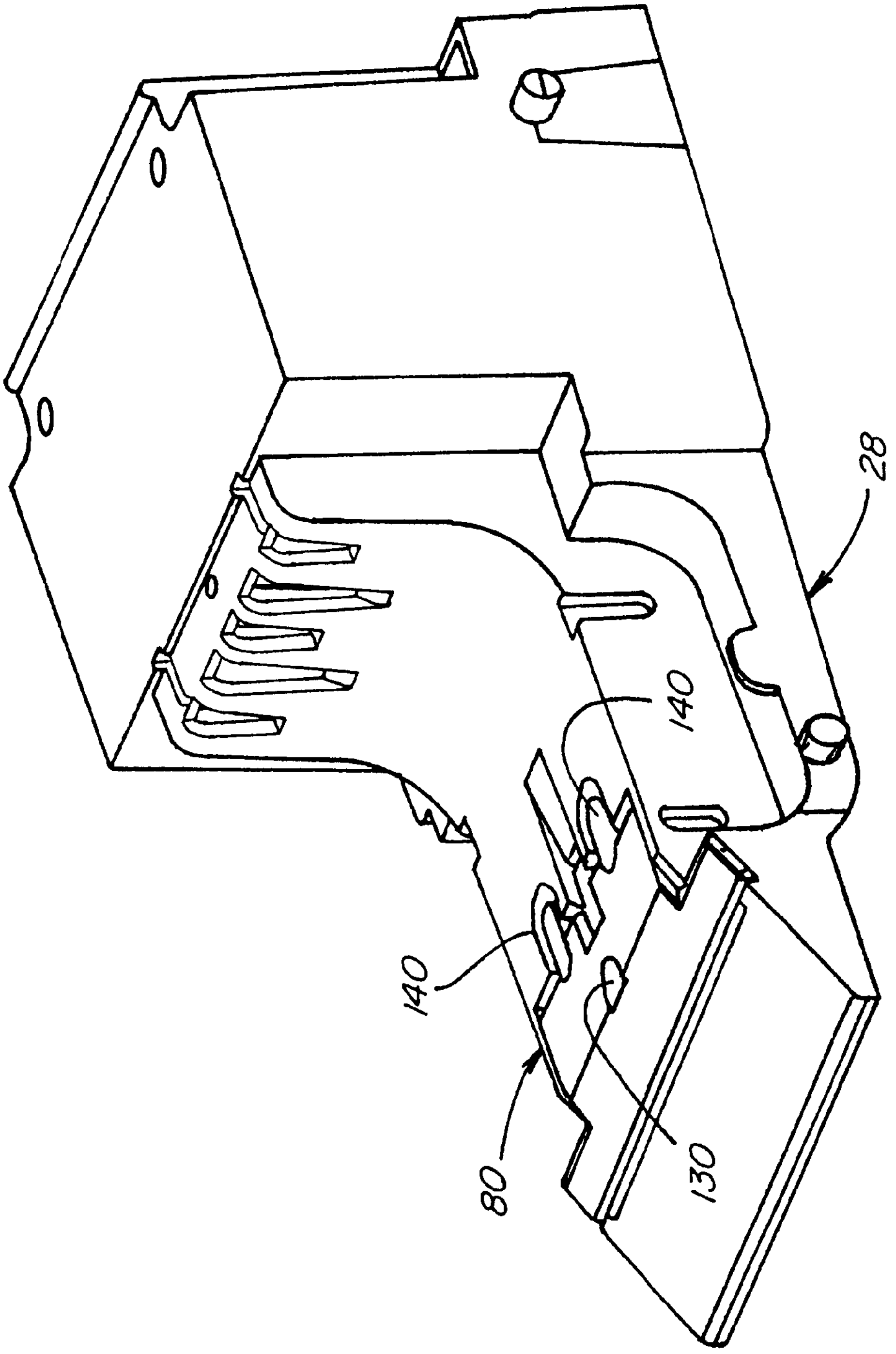
FIG. 3 is a perspective view of the lower bill transport mounting parts incorporating a lower lens housing.
Figure 4:
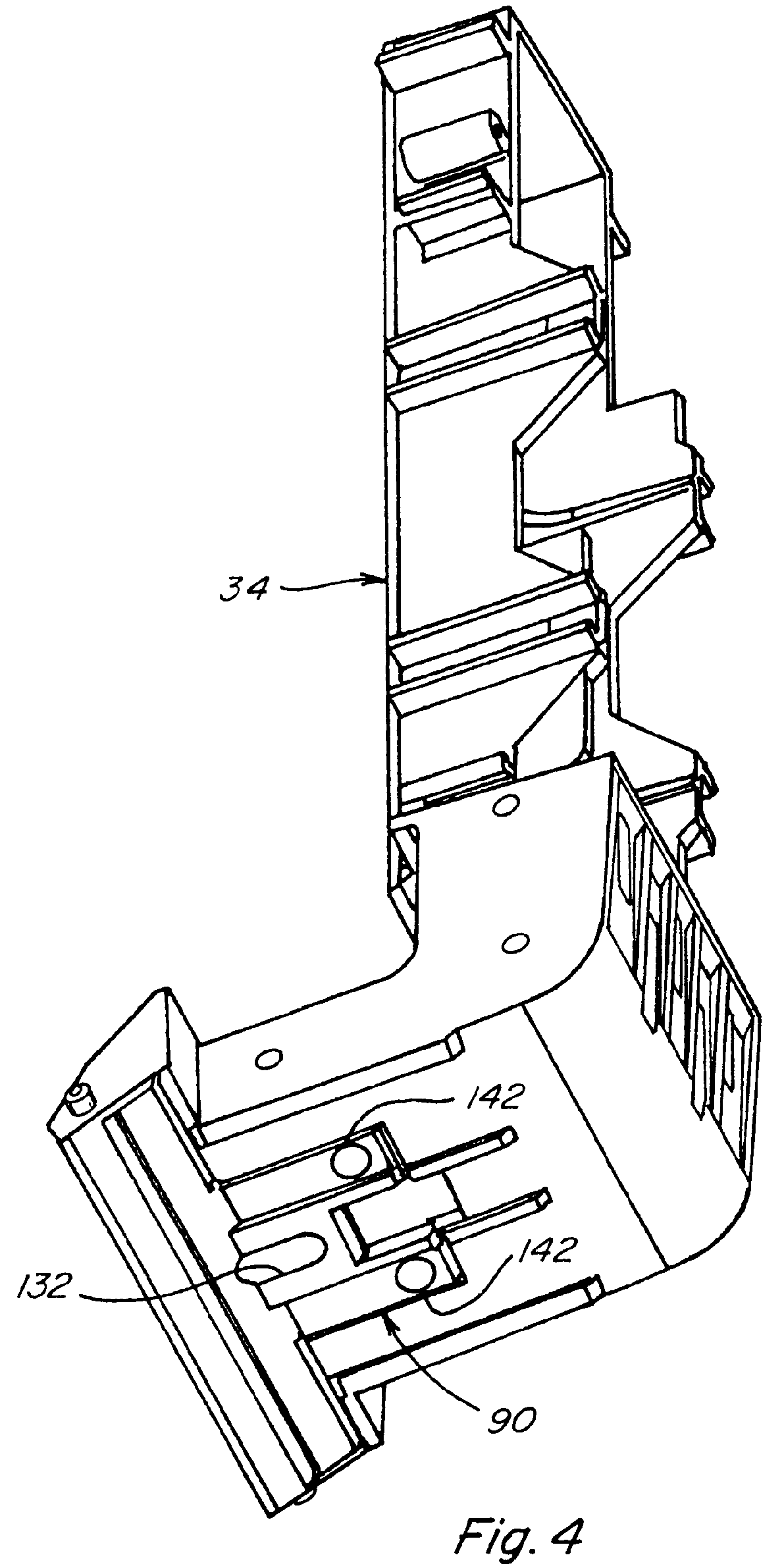
FIG. 4 is a perspective view of the upper bill transport mounting parts incorporating a lens chassis.

The optical scanner system, generally indicated by OS in FIGS. 1 and 2, is carried by the lower and upper supports 28 and 34, respectively As shown in FIGS. 3 and 4, the optical scanner system OS includes a lower member providing a lower lens housing 80 and an upper member providing an upper lens chassis 90.

Figure 5:
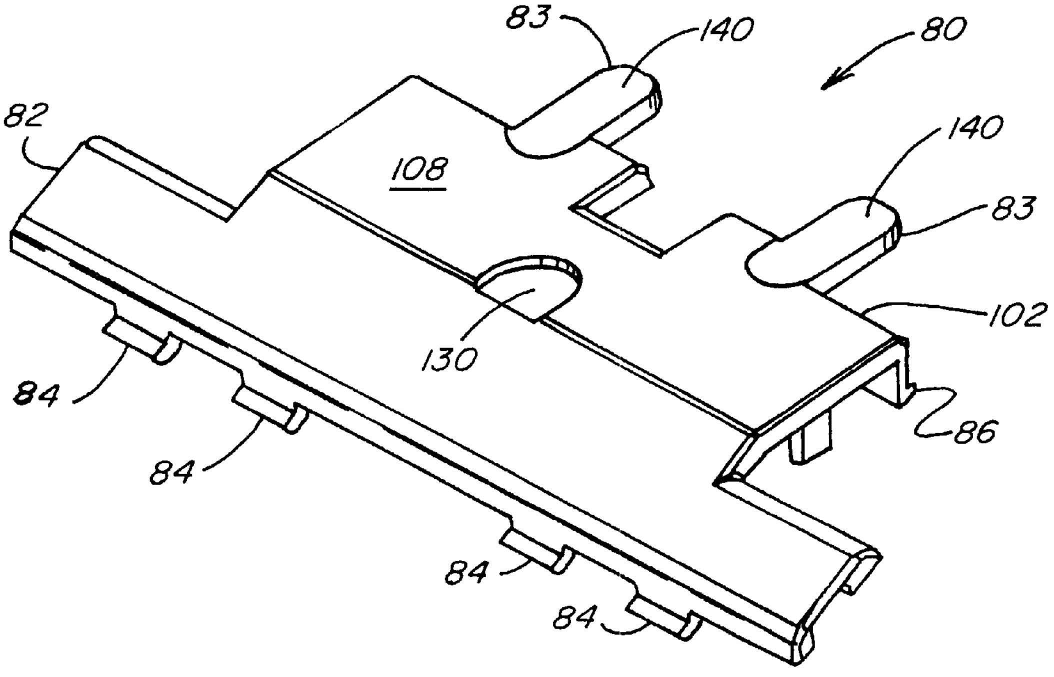
FIG. 5 is an enlarged perspective view of the lower lens housing.

As shown in FIG. 5, the lower lens housing 80 includes a downwardly inclined outer portion 82 having clips 84 and a generally horizontal inner portion 102, having a flat inner face 108 and inwardly extending, finger portions 83. Clips 84 and 86 provide a means for attaching the lower lens housing 80 to the lower support 28. Relatively recessed portions 130 and 140 are provided on the inner face 108, which are discussed in greater detail below with reference to FIGS. 7–9.

Figure 6:
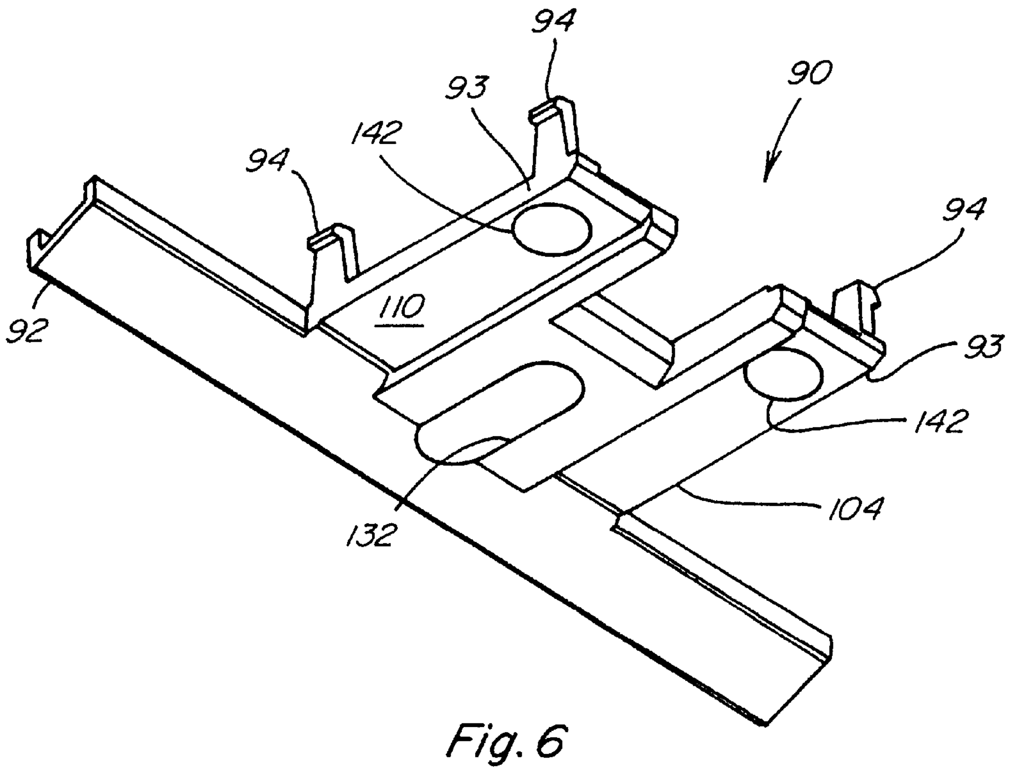
FIG. 6 is an enlarged perspective view of the lens chassis.

As shown in FIG. 6, the upper lens chassis 90 includes a downwardly inclined outer portion 92 and a generally horizontal inner portion 104 having a flat inner face 110, generally parallel to the flat inner face 108 of the lower lens housing 80, and inwardly extending finger portions 93. Clips 94 provide a means for attaching the lens chassis 90 to the upper support 34. Relatively recessed portions 132 and 142 are provided on the inner face 110, which are discussed in greater detail below with reference to FIGS. 7–9.

The light emitting elements, the photoelectric sensors and the circuitry which they control, are not shown in FIGS. 1–6. A detailed showing of these parts is not believed necessary for an understanding of the invention since they are well-known in the prior art and are similar to corresponding parts shown in U.S. Pat. No. 2,941,187 and U.S. Pat. No. 3,916,194 which are incorporated herein by reference.

Accordingly, it is believed that the improvement will be fully understood by reference to FIGS. 7–9, which will now be described using the same reference numerals as used in FIGS. 5 and 6.

Figure 7:
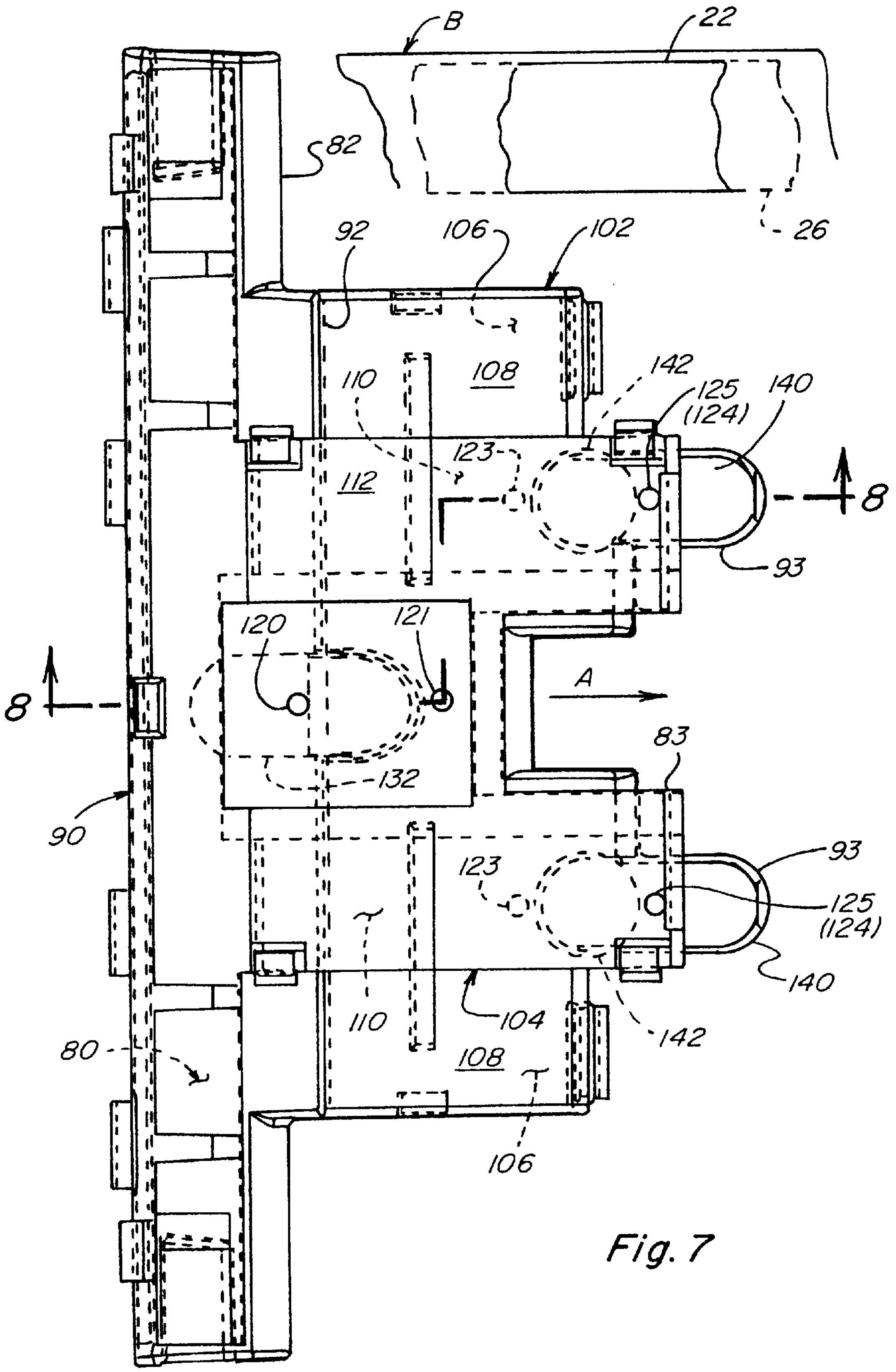
FIG. 7 is a fragmentary, simplified plan view of the lens system.
Figure 8:
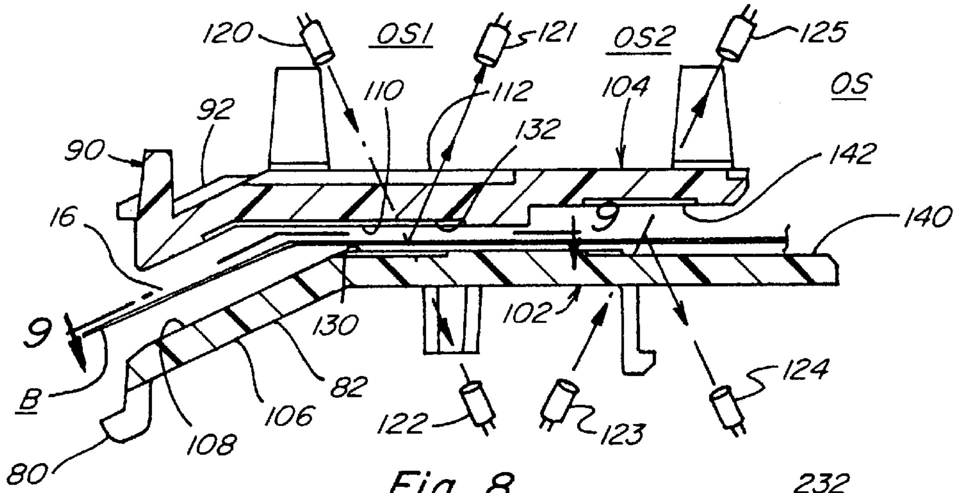
FIG. 8 is a cross sectional view taken on line 8—8 of FIG. 7.
Figure 9:
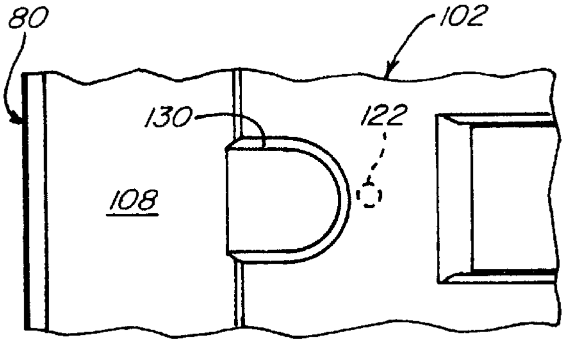
FIG. 9 is a plan view taken on line 9—9 of FIG. 8.

FIGS. 7–9 illustrate the arrangement of parts of the optical scanner indicated by OS. As shown, the scanner OS includes the lower plate member 102 and the upper plate member 104, both formed from transparent hard plastic material such as Lexan or from glass. The bill B is transported between the lower and upper plates 102 and 104 by the transport system 21, see FIGS. 1 and 2. The lower plate 102 includes inner and outer faces 108 and 106 respectively, and the upper plate 104 includes inner and outer faces 110 and 112 respectively. The opposed inner faces 108 and 110 of the plates 102 and 104 are spaced close together, of the order of 0.090 inches and the bill B is transported between the plates 102 and 104 by virtue of the arrangement of the transport system belts 22*e* and 26*c* and more specifically by the adjacent, horizontal flights of these belts.

The direction of travel of the bill B following insertion into the inlet 16, is indicated by the arrow A shown in FIG. 8.

As shown in FIGS. 7 and 8, the optical scanner OS consists of a first assembly OS1 and two symmetrically arranged second assemblies OS2 disposed equidistant about the axis of bill travel defined by arrow A. The first assembly OS1 is positioned closer to the bill inlet 16 and includes a single light emitting element 120 disposed above the upper plate 104 and two photoelectric sensors 121 and 122, sensor 121 being disposed above the upper plate 104 and sensor 122 being disposed below the lower plate 102. The second assemblies OS2 are positioned downstream of the first assembly OS1 and each second assembly OS2 includes a single light emitting element 123 disposed below the lower plate 102 and two photoelectric sensors 124 and 125, sensor 124 being disposed below the lower plate 102 and sensor 125 disposed above the upper plate 104. As shown in FIG. 8, the light emitting element 120 of the first assembly OS1 directs light through both the upper plate 104, the bill B and the lower plate 102 to be received by the sensor 122 and also directs light through the upper plate 104, which is reflected from the bill B back through the upper plate 104 to be received by the sensor 121. Similarly, the light emitting element 123 of each second assembly OS2 is directed through the lower plate 102, the bill B and the upper plate 104, to be received by the sensor 125 and also directs light through the lower plate 102 which is reflected from the bill B and back through the lower plate 102 to be received by the sensor 124.

In order to prevent dirt carried by the transported bill B from being transferred onto the inner faces of the lower plate 102 and the upper plate 104, the lower and upper plates are provided with recessed portions in the area defined by the axes of the light emitting elements 120 (123) and the light receiving sensors 121 (124) and 122 (125). Such recessed portions also prevent wear of the inner surfaces which would otherwise result from abrasion due to engagement by the bill B of the areas in question.

In the case of the first assembly OS1, the recessed portions include a generally circular recess 130 provided on the inner face 108 of the lower plate 102 and a generally oval-shaped recess 132 provided on the inner face of the upper plate 104. As shown, the recessed portions 130 and 132 may encroach on the inclined portions of the upper and lower plates defining the entry way of the bill inlet 16. In the case of the symmetrically arranged second assemblies OS2, the lower plate recessed portions include a generally oval-shaped recess 140 provided on the finger-like extensions 136 of the lower plate 102 and a generally circular recess 142 provided on the finger-like extensions 138 of the upper plate 104. It will be understood that the locations of the light emitting elements and the sensors are shown schematically in FIGS. 7–9 and the intersection of the beams in FIG. 7 is indicated by cross lines.

In FIG. 8 the bill transport path is shown in some places to be closer to the lower plate 102 than the upper plate 104. However, FIGS. 7 and 8 are shown enlarged about three times actual size for clarity and the closeness of the plates is such that the bill B comes into contact with both plates tending to abrade and deposit dirt onto the lower plate inner face 106 and the upper plate inner face 110.

In the embodiment shown, the recessed portions are about 0.20inches across and between 0.005–0.010 inches deep. These dimensions have proved sufficient to allow the bills B to contact the inner surfaces of the lower and upper plates 102 and 104 without sagging within the associated recesses. Thus, the area defined by the recesses is sufficient to remain clear and illuminate the selected portions of the bills B as they are transported between the plates.

In the embodiment shown in FIGS. 1–9 the recessed portions are formed by molding them into the oppositely disposed inner faces of the upper and lower plates. However, it will be understood by those skilled in the art that the relatively recessed portions can also be formed by providing a differential thickness in the plates in the area on the other side of where the recess is required, when the plates are injection molded, which locates a depression due to injection molding shrink factors, where the recess is required.

Another embodiment is shown in FIGS. 10–14 which is useful in those instances where a retro-fit adaptation of the invention is desired.

Figure 14:
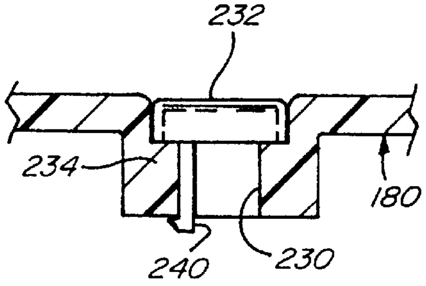
FIG. 14 is a cross sectional view taken on line 14—14 of FIG. 12.
Figure 13:
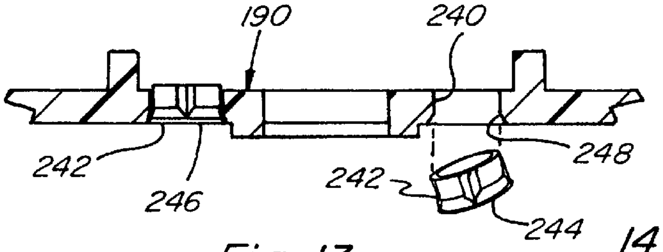
FIG. 13 is a cross sectional view taken on line 13—13 of FIG. 10.
Figure 12:
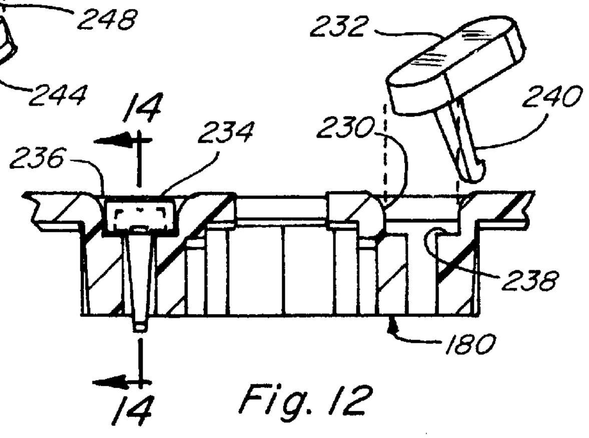
FIG. 12 is a cross sectional view taken on line 12—12 of FIG. 10.
Figure 10:
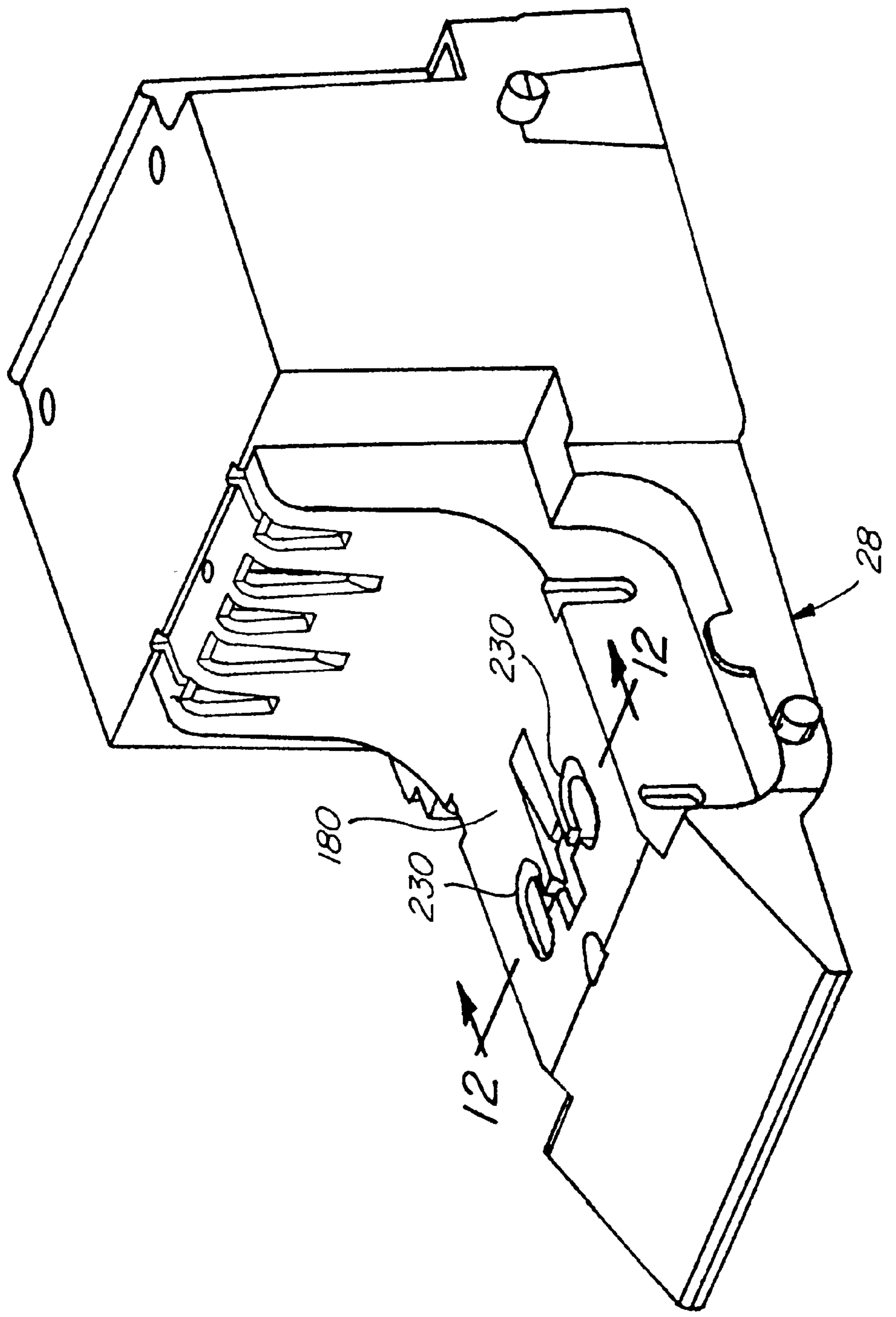
FIG. 10 is a perspective view of the lower bill transport mounting parts incorporating a modified lower lens housing.
Figure 11:
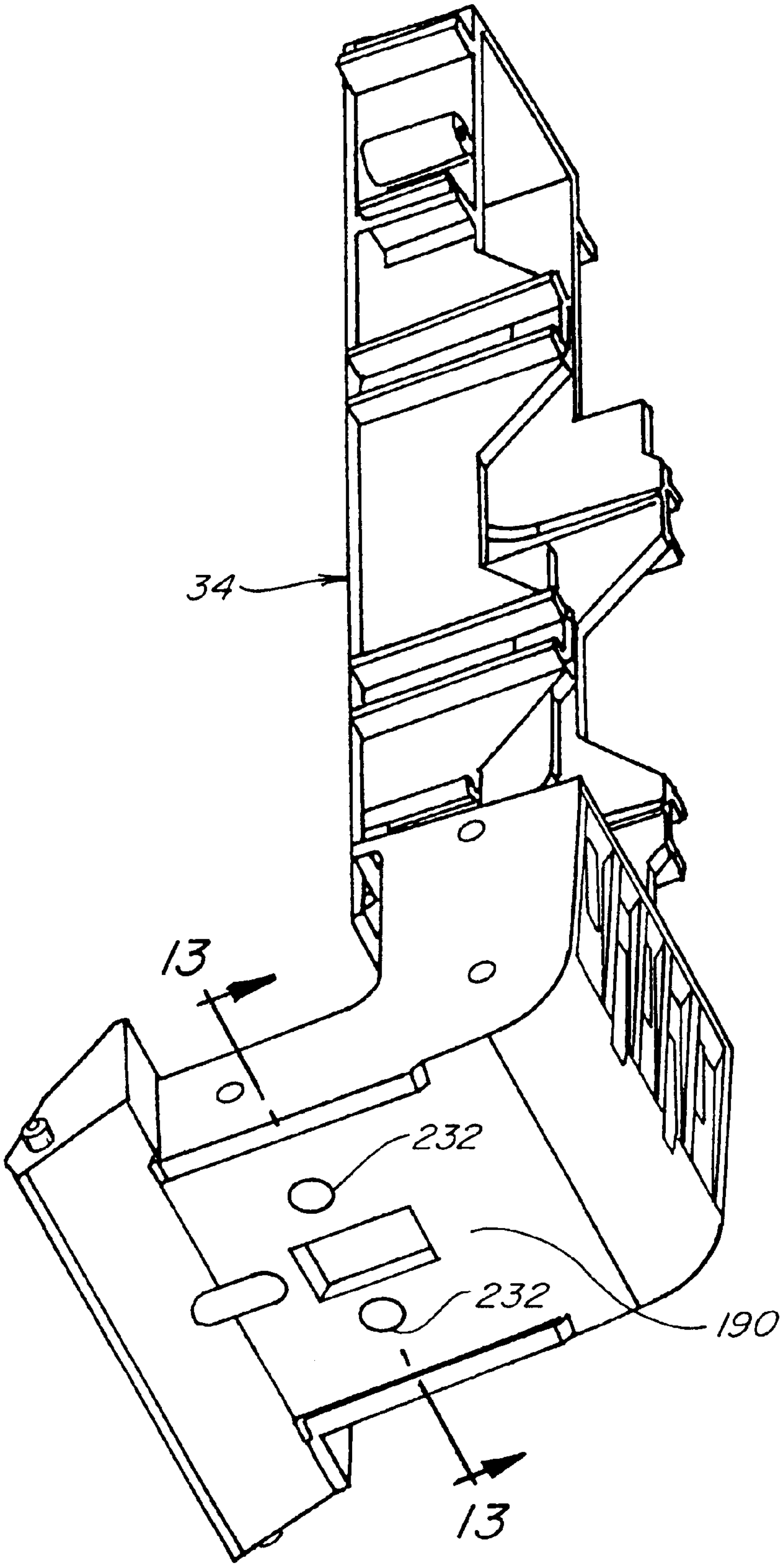
FIG. 11 is a perspective view of the upper bill transport mounting parts incorporating the modified lens chassis.

In this second embodiment, the lower and upper members are provided by the upper portion of the lower support 28 and the lower portion of the upper support 34 of the bill validator. In the case of the lower support, the support portion 180 has oval-shaped openings 230 formed therein to receive oval-shaped transparent elements 232 in snap-fit relation such that the upper surface of element 232 is disposed below the surface of said support portion to provide a recessed portion 236. The openings 230 are provided with abutments 238, which seat the element shoulder margin 234 to define the depth of the recess 236 at preferably about between 0.005–0.010 inches deep. The elements 232 are provided with a depending resilient leg 239 which is hooked to engage a stop means, provided by support portion 180, in snap-fit relation, as best shown in FIG. 14.

In the case of the upper support, the support portion 190 has circular openings 240 formed therein to receive circular transparent elements 242. The elements 242 include ribs 249, four in number in the embodiment shown, which facilitate a push-fit relation within the openings 240. The openings 230 are provided with abutments 248 and the elements 242 include annular shoulders 244 which are seated on the abutments 248 such that the lower surface of element 242 is disposed above the surface of the support portion to provide a recessed portion 246. When seated the depth of the recess is preferably about 0.005–0.010 inches deep In the preferred embodiment, the transparent elements 232 and 242 are formed from hard plastic, such as Lexan, or from glass. They are removable and replaceable.

Although the invention has been described by making detailed reference to the preferred embodiments, such detail is to be understood in an instructive rather than in any restrictive sense, many other variants being possible within the scope of the claims hereunto appended.

I claim as my invention:

1. In a bill validator, a bill scanner to determine the authenticity of a bill, the scanner comprising:

(a) a first member having spaced inner and outer faces;

(b) a second member having spaced inner and outer faces and, said first and second members being spaced apart to allow a bill to be transported between the inner faces of the first and second members at least one of said members including a light transmissive area;

(c) a light emitting means arranged to direct light through the light transmission area; and (d) a sensor means arranged to receive light from the light emitting means;

(e) the inner face of at least one of said first and second members including a recess means providing a recessed face which is spaced from said inner face substantially defining the light transmissive area to provide a non-contact face portion spaced from the bill transported across said inner face.

2. A scanner as defined in claim 1, in which:

(f) each of said first and second members includes a light transmissive area, and (g) the light emitting means is disposed on an outer face side of one of said first and second members and the sensor means is disposed on an outer face side of the other of said first and second members.

3. A scanner as defined in claim 2, in which:

(h) the inner face of each of said first and second members includes a recess means substantially defining the associated light transmissive area to provide a non-contact face portion spaced from the bill transported between said inner faces of said first and second members.

4. A scanner as defined in claim 2, in which:

(h) the first and second members are generally parallel and the recessed face is generally arcuate in configuration.

5. A scanner as defined in claim 1, in which:

(f) the first and second members are formed from transparent material.

6. A scanner as defined in claim 1, in which:

(f) the recess means is formed by an opening through said member into which is fitted a compatibly shaped transparent element having an upper surface portion disposed in spaced recessed relation from a surrounding surface of the opening.

7. A scanner as defined in claim 6, in which:

(g) the opening includes an annular abutment and the element includes a shoulder engageable with said abutment, the element being received within the opening in push-fit relation.

8. A scanner as defined in claim 6, in which:

(g) the opening includes an adjacent stop means and the element includes a resilient means engageable with the stop means in snap-fit relation.

9. In a bill validator, a bill scanner to determine the authenticity of a bill, the scanner comprising:

(a) a first transparent member having inner and outer faces and including spaced light transmissive areas;

(b) a second transparent member having inner and outer faces including spaced light transmissive areas disposed in substantially parallel relation to associated light transmissive areas of said first member;

(c) spaced light emitting means disposed on an outer face side of said first member and arranged to direct light through associated light transmissive areas;

(d) spaced sensor means disposed on an outer face side of said second member and arranged to receive light from associated light transmissive areas; and (e) the inner face of at least one of said first and second members including spaced recess means each providing a recessed face which is spaced from said inner face substantially defining the light transmissive areas to provide non-contact face portions spaced from the bill transported across said inner face.

10. A bill scanner as defined in claim 9, in which:

(f) the spaced recess means of the inner face of one of said members are provided by at least two circular recesses; and (g) the light emitting means includes two light emitting elements and the sensor means includes two associated sensor elements coaxially disposed with said light emitting elements and with associated circular recesses.

11. A scanner as defined in claim 10, in which:

said recesses are substantially about 0.005 to 0.010 inches in depth.

12. A bill validator comprising:

(a) a housing including a bill inlet;

(b) a bill transport system within the housing including conveying means for transporting the bill to a bill stacking position;

(c) an optical scanner between the entrance and the bill stacking position, the scanner including:

(i) a lower member having spaced inner and outer faces and including a pair of light transmissive areas;

(ii) an upper member having spaced inner and outer faces including a pair of associated light transmissive areas, said lower and upper members being spaced apart to allow a bill to be transported between the inner faces of the lower and upper members;

(iii) a pair of light emitting elements disposed on an outer face side of one of said lower and upper members, and arranged to direct light through associated light transmissive areas; and (iv) a pair of sensor elements disposed on an outer face side of the other of said lower and upper members, and arranged to receive light from associated light emitting elements;

(v) the inner face of at least one of said lower and upper members including a pair of recessed faces which are spaced from said inner face substantially defining the light transmissive areas to provide non-contact face portions spaced from the bill transported across said inner face.

13. A bill validator as defined in claim 12, in which:

(d) the housing includes lower and upper support members, and (e) the lower scanner member is operatively carried by the lower support member and the upper scanner member is operatively carried by the upper support member.

14. A bill validator as defined in claim 13, in which, (f) the lower and upper scanner members are snap-fitted into the lower and upper support members, respectively.

15. A bill validator as defined in claim 14, in which:

(g) the lower scanner member and the upper scanner member each include a generally horizontal portion providing the recesses.

* * * * *